United States Patent
Chen

(10) Patent No.: US 6,679,376 B2
(45) Date of Patent: Jan. 20, 2004

(54) MD, CD AND MAGNETIC DISK BOX STRUCTURE

(76) Inventor: Yung-Tsun Chen, 58, Ma Yuan West St., Taichung (TW)

( * ) Notice: Subject to any disclaimer, the term of this patent is extended or adjusted under 35 U.S.C. 154(b) by 108 days.

(21) Appl. No.: 10/073,789

(22) Filed: Feb. 8, 2002

(65) Prior Publication Data

US 2003/0150751 A1 Aug. 14, 2003

(51) Int. Cl.⁷ .............................................. B65D 85/57
(52) U.S. Cl. ..................... 206/308.1; 206/445; 206/472; 402/63
(58) Field of Search .............................. 206/307, 308.1, 206/387.11, 472, 473, 475, 445; 402/61, 63

(56) References Cited

U.S. PATENT DOCUMENTS

| | | | | |
|---|---|---|---|---|
| 4,231,474 A | * | 11/1980 | Takahashi | 206/387.13 |
| 4,549,669 A | * | 10/1985 | Rozporka | 220/835 |
| 4,753,347 A | * | 6/1988 | Bellante et al. | 206/387.1 |
| 5,209,593 A | * | 5/1993 | Ros | 402/77 |
| 5,597,068 A | * | 1/1997 | Weisburn et al. | 206/308.1 |
| 5,720,384 A | * | 2/1998 | Wu-Chen | 206/308.1 |
| 5,975,298 A | * | 11/1999 | Sankey et al. | 206/387.13 |
| 6,483,787 B1 | * | 11/2002 | Sugasawa et al. | 369/44.13 |
| 6,550,614 B1 | * | 4/2003 | Onmori et al. | 206/387.13 |

* cited by examiner

Primary Examiner—Jim Foster

(57) ABSTRACT

A MD, CD and magnetic disk box structure includes a connecting plate having a first side provided with a first box, and a second side provided with a second box. The first box has a peripheral face having a determined height, and the second box has a peripheral face having a determined height, so that the fist box and the second box may be combined to form a closed state.

11 Claims, 5 Drawing Sheets

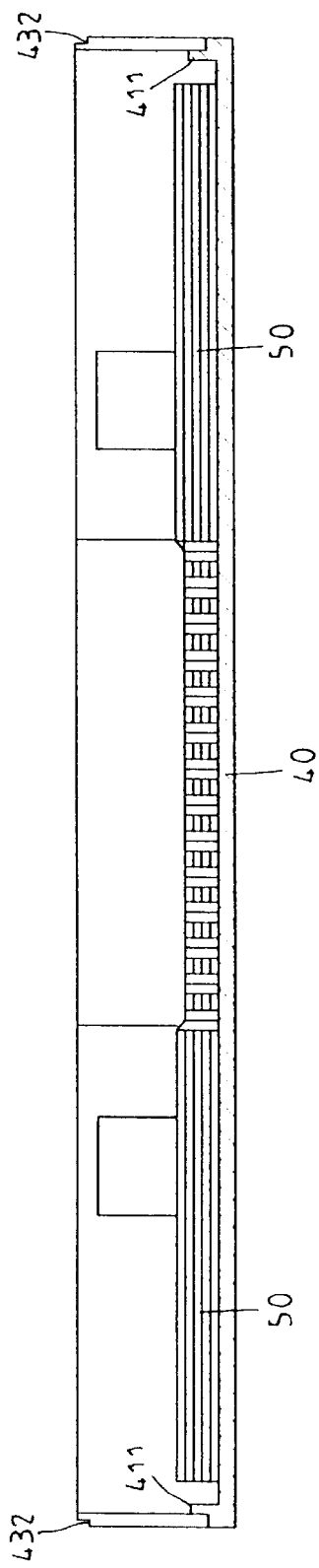
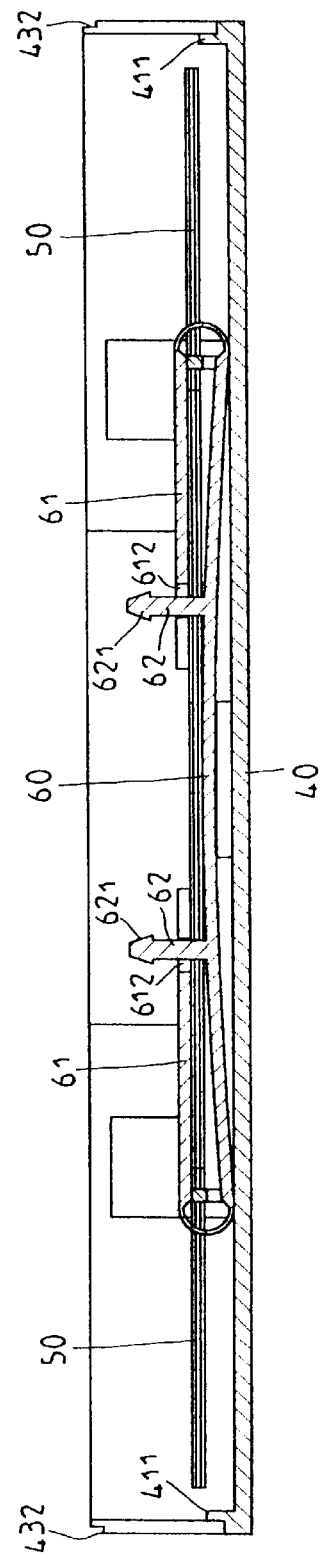

MD, CD AND MAGNETIC DISK BOX STRUCTURE

BACKGROUND OF THE INVENTION

1. Field of the Invention

The present invention relates to a mini disc (MD), compact disc (CD) and magnetic disk box structure, and more particularly to a MD, CD and magnetic disk box structure that may form an entirely closed state, so that the dust, dirt or the like cannot enter the inside of the MD, CD and magnetic disk box structure, thereby achieving the sealing and cleaning effect.

2. Description of the Related Art

A conventional MD, CD and magnetic disk box structure in accordance with the prior art shown in FIGS. 1 and 2 comprises a protective file 30, and multiple sheets 20 for containing MD, CD or magnetic disks therein. Each of the sheets 20 has one end welded on a mediate portion of the protective file 30. The protective file 30 includes a connecting plate 31, a top plate 32 and a bottom plate 33, and folding lines 34 are defined on connections between the connecting plate 31, the top plate 32 and the bottom plate 33. The bottom plate 33 of the protective file 30 is formed with multiple through holes 35 for passage of an elastic rope 36. The elastic rope 36 has a first end secured on a fixing member on the bottom plate 33 of the protective file 30, and a second end in turn extended through the multiple through holes 35 of the bottom plate 33 of the protective file 30 and then formed with a knot, so that the top plate 32 of the protective file 30 may be retained by the elastic rope 36.

However, when the protective file 30 of the conventional MD, CD and magnetic disk box structure is closed, the periphery of the top plate 32 and the bottom plate 33 of the protective file 30 is not closed, thereby presenting an open state, so that the dust, dirt or the like easily enters the inside of the protective file 30. In addition, the top plate 32 and the bottom plate 33 of the protective file 30 are easily deformed or distorted when being compressed or bent, thereby easily damaging or breaking the MD, CD or magnetic disks stored in the protective file 30 of the conventional MD, CD and magnetic disk box structure.

SUMMARY OF THE INVENTION

The present invention has arisen to mitigate and/or obviate the disadvantage of the conventional MD, CD and magnetic disk box structure.

The primary objective of the present invention is to provide a MD, CD and magnetic disk box structure, wherein when the MD, CD and magnetic disk box structure is closed, the connecting plate, the peripheral face of the first box and the peripheral face of the second box may form an entirely closed state, so that the dust, dirt or the like cannot enter the inside of the MD, CD and magnetic disk box structure, thereby achieving the sealing and cleaning effect.

Another objective of the present invention is to provide a MD, CD and magnetic disk box structure, wherein the peripheral face of the first box and the peripheral face of the second box may be secured in the positioning groove and retained between the two spaced positioning ribs of the connecting plate, so that the first box and the second box may be fixed rigidly and stably.

A further objective of the present invention is to provide a MD, CD and magnetic disk box structure, wherein the positioning posts mounted on the inner wall of the peripheral face of the first box and the inner wall of the peripheral face of the second box may be used to fix the first box and the second box, thereby preventing the MD, CD or magnetic disks stored in the MD, CD and magnetic disk box structure from being deformed or distorted when being compressed or bent, thereby protecting the MD, CD or magnetic disks stored in the MD, CD and magnetic disk box structure.

In accordance with the present invention, there is provided a MD, CD and magnetic disk box structure, comprising: a connecting plate having a first side provided with a first box, and a second side provided with a second box, the first box having a peripheral face having a determined height, the second box having a peripheral face having a determined height, so that the fist box and the second box may be combined to form a closed state.

Further benefits and advantages of the present invention will become apparent after a careful reading of the detailed description with appropriate reference to the accompanying drawings.

BRIEF DESCRIPTION OF THE DRAWINGS

FIG. 5 is a side plan cross-sectional assembly view of a MD, CD and magnetic disk box structure in accordance with a first embodiment of the present invention; and FIG. 6 is a side plan cross-sectional assembly view of a MD, CD and magnetic disk box structure in accordance with a second embodiment of the present invention.

DETAILED DESCRIPTION OF THE INVENTION

Figure 1:
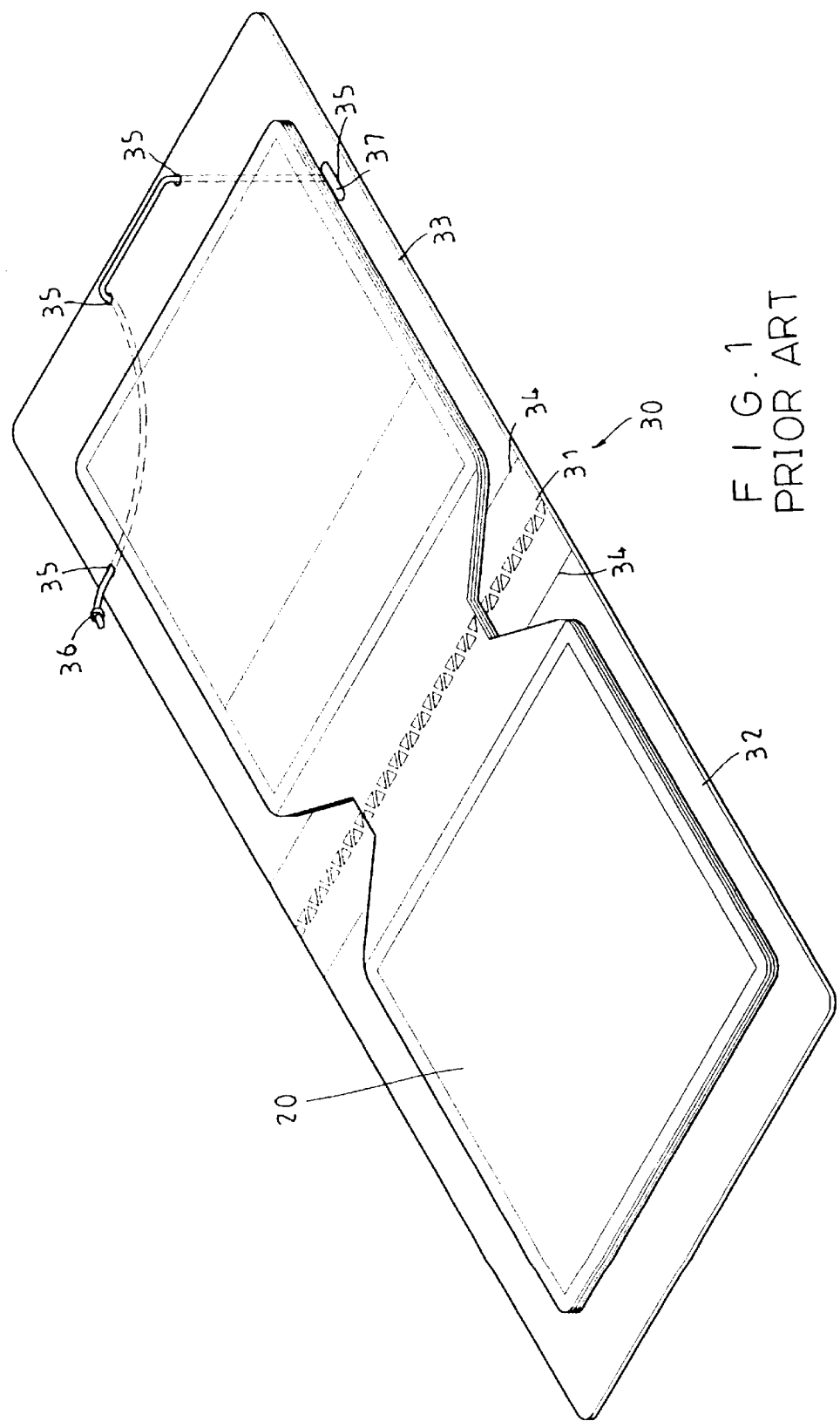
FIG. 1 is a perspective view of a conventional MD, CD and magnetic disk box structure in accordance with the prior art.
Figure 2:
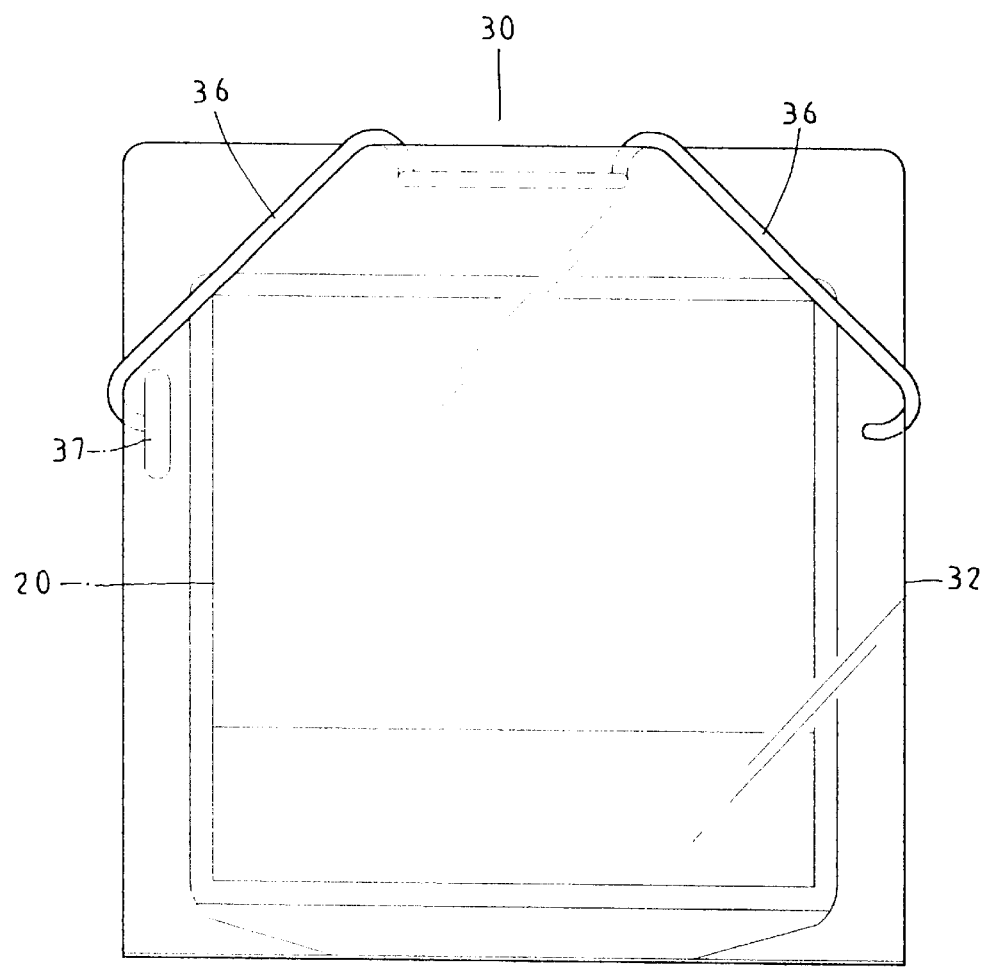
FIG. 2 is a plan view of a conventional MD, CD and magnetic disk box structure in accordance with the prior art.
Figure 3:
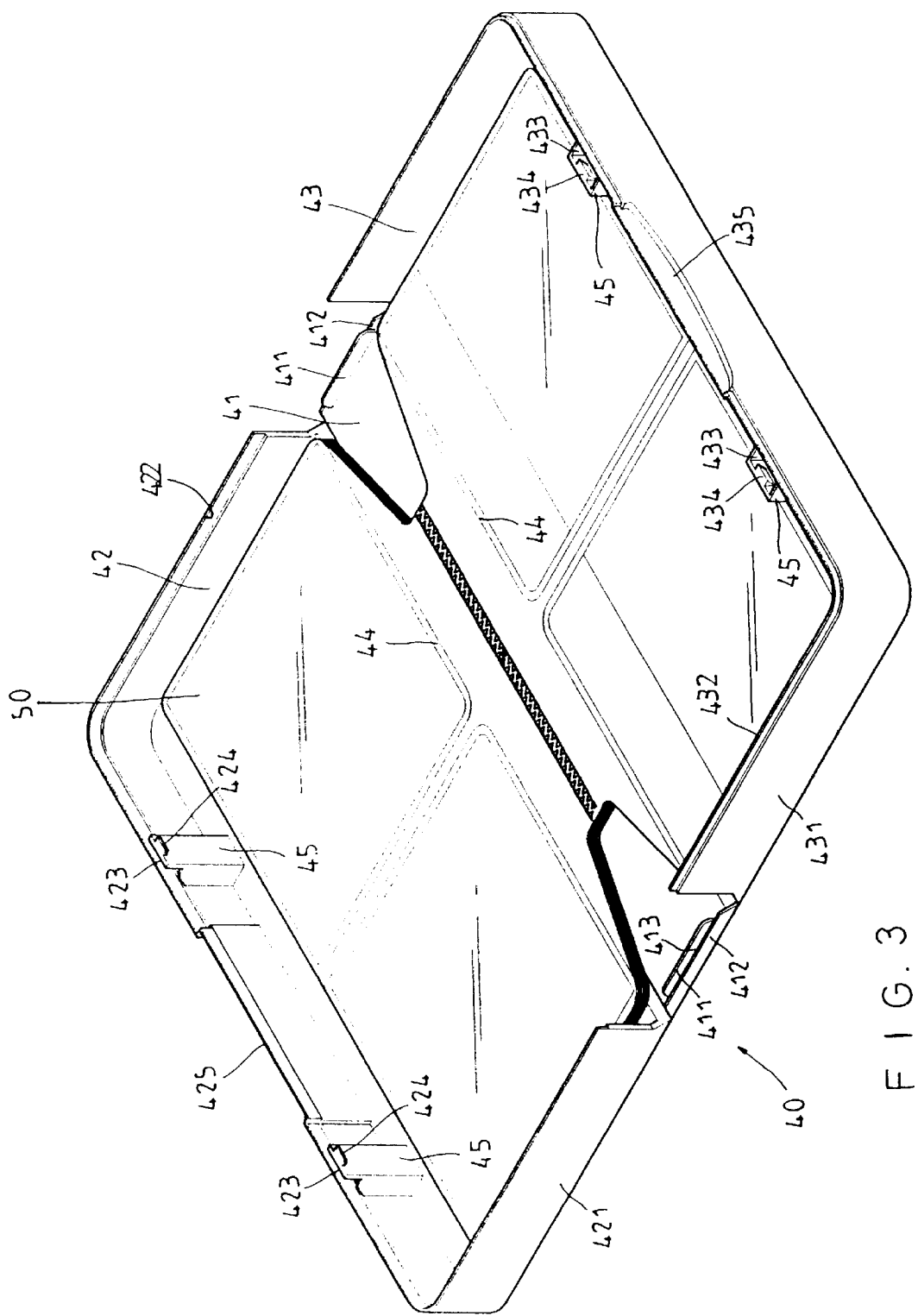
FIG. 3 is a perspective view of a MD, CD and magnetic disk box structure in accordance with a first embodiment of the present invention.
Figure 4:
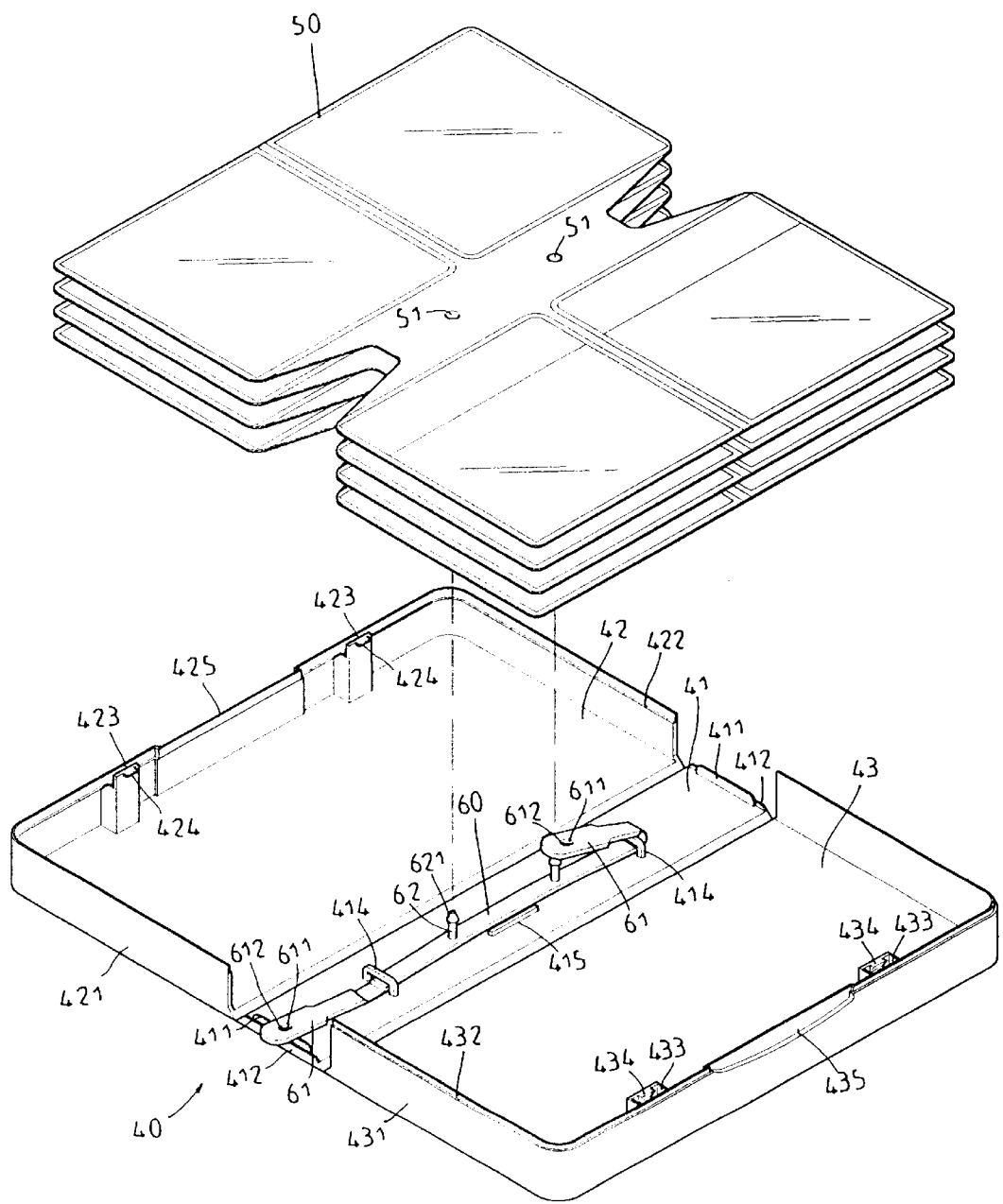
FIG. 4 is an exploded perspective view of a MD, CD and magnetic disk box structure in accordance with a second embodiment of the present invention.

Referring to the drawings and initially to FIGS. 3 and 4, a MD, CD and magnetic disk box structure in accordance with a preferred embodiment of the present invention is shown, wherein FIG. 3 is a perspective view of a MD, CD and magnetic disk box structure in accordance with a first embodiment of the present invention, and FIG. 4 is an exploded perspective view of a MD, CD and magnetic disk box structure in accordance with a second embodiment of the present invention.

As shown in FIG. 3, the MD, CD and magnetic disk box structure 40 in accordance with a preferred embodiment of the present invention comprises a connecting plate 41 whose mediate portion has a predetermined width. The connecting plate 41 has a first side provided with a first box 42, and a second side provided with a second box 43. The connections between the connecting plate 41, the first box 42 and the second box 43 are provided with folding lines 44, so that the first box 42 and the second box 43 may be folded relative to the connecting plate 41 along the folding lines 44.

The first box 42 has a peripheral face 421 having a determined height, and the second box 43 has a peripheral face 431 having a determined height. The total height of the peripheral face 421 of the first box 42 and the peripheral face 431 of the second box 43 is equal to the width of the connecting plate 41. In addition, the peripheral face 421 of the first box 42 is formed with an inner stepped edge 422, and the peripheral face 431 of the second box 43 is formed with an outer stepped edge 432.

The connecting plate 41 has two ends each provided with two spaced positioning ribs 411 and 412, and a positioning groove 413 formed between the two spaced positioning ribs 411 and 412, so that the peripheral face 421 of the first box 42 and the peripheral face 431 of the second box 43 may be secured in the positioning groove 413 and retained between the two spaced positioning ribs 411 and 412 of the connecting plate 41.

The MD, CD and magnetic disk box structure 40 further comprises multiple positioning posts 45 mounted on the inner wall of the peripheral face 421 of the first box 42 and the inner wall of the peripheral face 431 of the second box 43, thereby preventing the MD, CD or magnetic disks stored in the MD, CD and magnetic disk box structure 40 from being deformed or distorted when being compressed or bent, thereby protecting the MD, CD or magnetic disks stored in the MD, CD and magnetic disk box structure 40.

In addition, the inner wall of the peripheral face 431 of the second box 43 is provided with multiple locking grooves 434 each formed with a locking block 434. The inner wall of the peripheral face 421 of the first box 42 is provided with multiple locking hooks 423 each secured in each of the locking grooves 433 of the peripheral face 431 of the second box 43 and each formed with a locking block 424 each engaged with the locking block 434 of each of the locking grooves 433 of the peripheral face 431 of the second box 43, so that each of the locking hooks 423 of the peripheral face 421 of the first box 42 may be locked in each of the locking grooves 433 of the peripheral face 431 of the second box 43, thereby securing the first box 42 on the second box 43.

Further, the peripheral face 421 of the first box 42 is formed with a depression 425, and the peripheral face 431 of the second box 43 is formed with a depression 435, so that the user's finger may press the depression 425 of the peripheral face 421 of the first box 42 and the depression 435 of the peripheral face 431 of the second box 43 to detach the first box 42 from the second box 43, thereby opening the MD, CD and magnetic disk box structure 40.

The MD, CD and magnetic disk box structure 40 further comprises multiple sheets 50 for containing MD, CD or magnetic disks therein. Each of the sheets 50 has one end welded on a mediate portion of the connecting plate 41.

As shown in FIG. 4, the connecting plate 41 has a mediate portion provided with two support seats 414 for passage of two ends of a sheet clip 60, and two parallel positioning blocks 415. The distance between the two parallel positioning blocks 415 is equal to the width of the sheet clip 60. The sheet clip 60 has two ends each provided with a foldable plate 61 passing through the support seat 414. The foldable plate 61 is formed with an "8"-shaped slot which has a larger snap hole 611 and a smaller snap hole 612.

The sheet clip 60 is provided with two spaced snap members 62 each mating with the "8"-shaped slot of the foldable plate 61. Each of the two snap members 62 has a top formed with an enlarged head 621. Each of the sheets 50 is formed with two spaced through holes 51 for mounting the two snap members 62.

After the sheets 50 are mounted on the two snap members 62, the larger snap hole 611 of the "8"-shaped slot of the foldable plate 61 may be snapped on the enlarged head 621 of each of the two snap members 62. Then, the foldable plate 61 may be moved, whereby the enlarged head 621 of each of the two snap members 62 may be snapped into and retained by the smaller snap hole 612 of the "8"-shaped slot of the foldable plate 61, so that the foldable plate 61 may be secured on the enlarged head 621 of each of the two snap members 62.

FIG. 5 is a side plan cross-sectional assembly view of a MD, CD and magnetic disk box structure in accordance with a first embodiment of the present invention, and FIG. 6 is a side plan cross-sectional assembly view of a MD, CD and magnetic disk box structure in accordance with a second embodiment of the present invention.

As shown in FIGS. 5 and 6, when the MD, CD and magnetic disk box structure 40 is closed, the connecting plate 41, the peripheral face 421 of the first box 42 and the peripheral face 431 of the second box 43 may form an entirely closed state, so that the dust, dirt or the like cannot enter the inside of the MD, CD and magnetic disk box structure 40, thereby achieving the sealing and cleaning effect.

In addition, the peripheral face 421 of the first box 42 and the peripheral face 431 of the second box 43 may be secured in the positioning groove 413 and retained between the two spaced positioning ribs 411 and 412 of the connecting plate 41, so that the first box 42 and the second box 43 may be fixed rigidly and stably.

Further, the positioning posts 45 mounted on the inner wall of the peripheral face 421 of the first box 42 and the inner wall of the peripheral face 431 of the second box 43 may be used to fix the first box 42 and the second box 43, thereby preventing the MD, CD or magnetic disks stored in the MD, CD and magnetic disk box structure 40 from being deformed or distorted when being compressed or bent, thereby protecting the MD, CD or magnetic disks stored in the MD, CD and magnetic disk box structure 40.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A disk box comprising:
    a connecting plate including a first side and a second side,
    a first box provided on said first side of said connecting plate, and including a peripheral face having a determined height,
    a second box provided on said second side of said connecting plate, and including a peripheral face having a determined height, and
    said connecting plate including two ends each provided with two spaced positioning ribs, and a positioning groove formed between said two spaced positioning ribs to receive said peripheral face of said first box and said peripheral face of said second box, and to retain said peripheral face of said first box and said peripheral face of said second box between said two spaced positioning ribs of said connecting plate.

2. The disk box according to claim 1 further comprising folding lines provided between said connecting plate and said first box and said second box to allow said first box and said second box to be folded relative to said connecting plate along said folding lines.

3. The disk box according to claim 1, wherein said peripheral faces of said first box and said second box include a total height equal to a width of said connecting plate.

4. The disk box according to claim 1, wherein said peripheral face of said first box includes an inner stepped edge formed therein, and said peripheral face of said second box includes an inner stepped edge formed therein.

5. The disk box according to claim 1 further comprising multiple positioning posts mounted on inner wall of said peripheral face of said first box and inner wall of said peripheral face of said second box.

6. The disk box according to claim 1, wherein said peripheral face of said second box is provided with at least one locking block having a locking groove formed therein, said peripheral face of said first box is provided with at least one locking block having a locking hook provided thereon for engaging into said locking groove of said at least one locking block of said second box, and said at least one locking block of said first box is engaged with said at least one locking block of said second box.

7. The disk box according to claim 1, wherein said peripheral face of said first box is formed with a depression, and said peripheral face of said second box is formed with a depression.

8. The disk box according to claim 1 further comprising multiple sheets containing MD, CD or magnetic disks therein, and each of said sheets includes one end welded on a mediate portion of said connecting plate.

9. A disk box comprising:
a connecting plate including a first side and a second side, said connecting plate including a mediate portion provided with two support seats,
a first box provided on said first side of said connecting plate, and including a peripheral face having a determined height,
a second box provided on said second side of said connecting plate, and including a peripheral face having a determined height, and
a sheet clip including two ends engaged through said support seats of said connecting plate, and including two parallel positioning blocks for retaining said sheet clip.

10. The disk box according to claim 9, wherein a distance between said two parallel positioning blocks is equal to a width of said sheet clip.

11. The disk box according to claim 9, wherein said sheet clip includes two ends each provided with a foldable plate passing through said support seat, said foldable plate is formed with an "8"-shaped slot having a larger snap hole and a smaller snap hole, said sheet clip is provided with two spaced snap members each mating with said "8"-shaped slot of said foldable plate, each of said two snap members includes a top formed with an enlarged head.

* * * * *